United States Patent Office 2,805,146
Patented Sept. 3, 1957

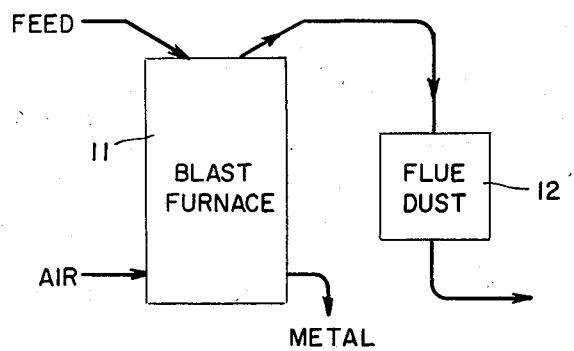
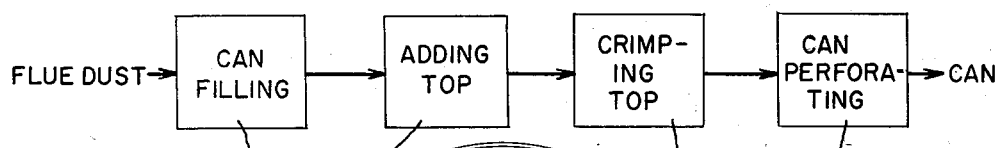
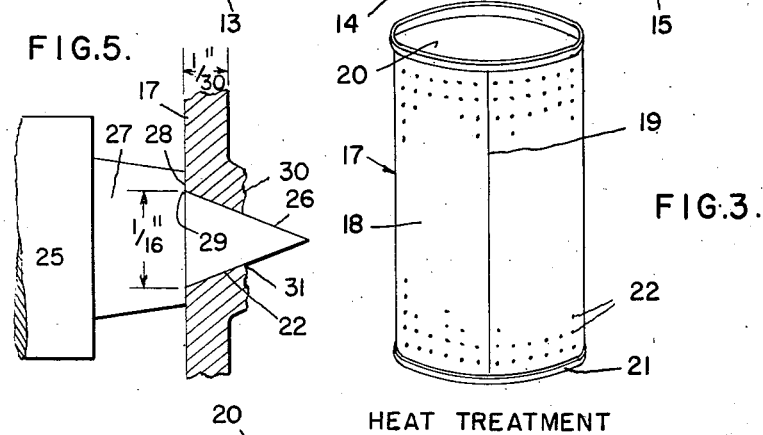
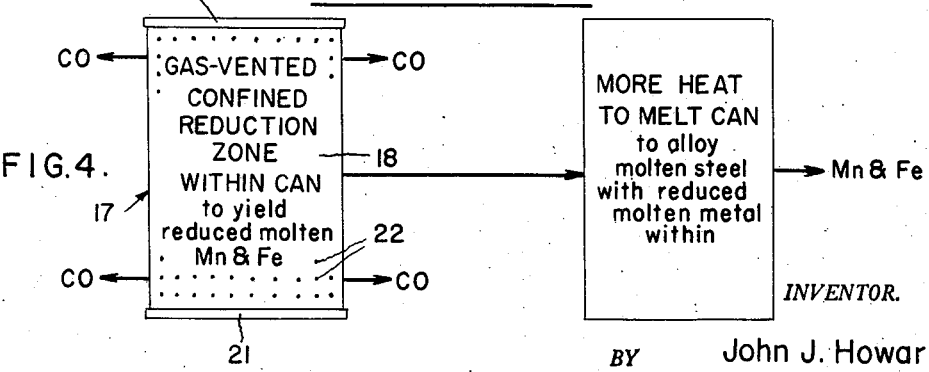

2,805,146

ORE REDUCTION IN CANS

John J. Howard, Philadelphia, Pa., assignor to John Conlan Howard, Bethlehem, Pa.

Application December 15, 1955, Serial No. 553,286

4 Claims. (Cl. 75—38)

This invention relates to the obtaining of ferro-manganese, which is an alloy containing from 72% to 80% of manganese with iron and containing about 6½% carbon. As the United States has a very limited tonnage of manganese ore, which is the main source of manganese that is such a vital strategic material for national defense, the Government has been buying practically all the manganese ore available in the free world. The Bureau of Mines has devoted a great deal of time and energy not only in trying to find ways to conserve what manganese we use, but also in developing methods to recover manganese that has been lost in blast-furnace slag and in open-hearth slag. But since high-grade manganese ores usually have a very high melting point, some up to within a few degrees of 3,000° F., it is evident that recoveries are difficult. The greatest waste of all, however, comes from blast furnaces, in the form of what is called flue dust, which often contains as much as 35% manganese and up to 30% carbon as coke. Efforts have been made to briquette the flue dust that will stand the rough handling in a blast furnace, but they have all been unsuccessful because irrespective of their binder and compaction, the briquettes break down again in the furnace and the dust blows over as before. Flue dust has been sintered and nodulized, but the product of such treatment is still manganese ore and still must be given blast-furnace treatment. So the object of this invention is to devise ways and means whereby the flue dust that is rich in manganese ore and also in coke, can be treated economically to recover ferro-manganese without having to use a binder for the dust of compaction thereof. In sintering or nodulizing, the dust, coke burns and softens the ore to a clinker or nodule, and this product is still an oxide so it must be put back into the furnace for reduction of its metallic content, and this uses up more coke in the furnace burden. So it is an object of this invention to overcome these disadvantages by devising ways and means for returning the flue dust to the furnace and rendering it proof against escape therefrom. It is another object to treat such dust under conditions whereby the returned dust can, while in the furnace, be isolated from the furnace burden and its reduction process carried out within the furnace but in a confined reaction zone therein. A further object is to devise a container in which the dust can be so isolated, yet when the container melts as it must, contributes no contaminating substance to the metal produced in the furnace. Another object is to find a material for the container whose melting point is higher than the reduction temperature of the isolated dust contents within the container. Still another object is to find a material for the container, which after it is melted, adds a metal to the metal yielded by the furnace that is compatible therewith. A further object is to devise ways and means associated with the container whereby the excess gas yielded in the confined reaction zone can escape to prevent rupture of the container yet maintaining the reacting solid contents of the container isolated from the environment of the container.

Such objects and possibly others can be realized by flowing a dry homogeneous mixture of finely divided metallic oxide ore and carbon into a steel container that is substantially free from tin and lead; closing the can with the mixture and air substantially uncompacted therein to provide a confined reaction zone in the can; subjecting the contents of the can to a reaction-inducing temperature between the carbon and the metallic oxides present to yield a molten reduction product of the metal of the oxides; meanwhile providing gas-outflow openings or perforations in the container constructed and arranged for holding back solid particles but for venting reaction-product carbon monoxide yielded in the otherwise confined reaction zone; and raising the temperature of the container until its steel melts and alloys with its molten reduced contents; and then recovering the resulting metal alloy.

The invention is illustrated in the accompanying drawings in which Fig. 1 is a diagrammatic view of a blast furnace and its dust-catcher from which the flue dust is derived. Fig. 2 shows a diagrammatic view of the encasing treatment. Fig. 3 shows a perspective view of one of the cans of this invention. Fig. 4 is a diagrammatic view of the heat treatment stations. Fig. 5 is a partial view, much magnified, showing how a perforation is made in the can.

In the drawings, 11 represents a usual ferro-manganese producing blast furnace while 12 represents its dust-catcher. The blast furnace is fed at the top with iron-bearing manganese ore, coke, and limestone, as is usual; supplied with air under pressure at its base; and from its base issues the molten reduced manganese and iron. In Fig. 2 the dry flue dust from the dust-catcher goes to a can-filling station 13, where the can can be vibrated to get a maximum quantity of dust in each can; thence to a station 14 when the top is applied to the steel can; next to a station 15 where the top is crimped in place; and finally to a can-perforating station 16. The perforated crimped can is shown as 17 in Fig. 3, having a substantially cylindrical body 18 provided with a crimped seam 19, and two crimped-in ends 20 and 21. The perforations are shown at 22. The can is of steel and is non-soldered and is held together by crimping since if it were sealed by the use of tin or lead, the latter would be contaminative of the ferro-manganese end product. In Fig. 4 the can at the left represents one stage of heat treatment with the can in a furnace such as a blast furnace or an open hearth furnace, wherein the temperature of the contents of the can are raised to reaction-inducing temperature so that within the can as a confined reaction zone, there is effected an oxide-reducing reaction between the oxides of the ore particles of the flue dust and the carbon-bearing particles of the coke whereby there is yielded a mass of molten metallic manganese and iron, and a gas of carbon monoxide. The volume of evolved carbon monoxide is rather large and thus in excess of what the can will hold, because the gas pressure within it is greater than the pressure in its environment. Therefore, perforations 22 are provided for venting evolved gas from the can but they are so sized as to hold back in the can the solid particles of its contents that may have not yet reacted with the carbon. The station at the right hand of Fig. 4 indicates the second phase of the heat treatment, namely, after the reducing reaction is completed in the confined reaction zone within the can at about 2700° F. and the molten metal is present therein, further heat from the furnace that operates at about 3000° F. melts the steel of the can whereupon the molten steel of the can alloys itself with the molten reduced metal of the manganese and iron. A steel for the can is selected to have a melting point somewhat higher than that of the melting point of the manganese and iron so that the melting of the manganese and the iron takes place prior to the melting of the steel of the can because it is important to have the reducing reaction take place in a confined reaction zone provided by the can itself. For this purpose and for ease of perforating the can, a steel sheet of 30 gauge has proven to be satisfactory as the starting material for the can.

Fig. 5 illustrates one manner of forming the perforations that has proven satisfactory. The steel used for the can is 30 gauge, which while actually $32/1000$ of an inch thick, has been shown in this figure to be generally $1/30$ of an inch thick. In such a thickness of a steel sheet, it has been found that the perforations 22 should be made by punching with a tool such as a punch 25 having a hardened needle-like tapered or coned metal-piercing point 26, merging into an enlarged portion 27 having a shoulder 28 that prevents further passage of the point 26 through the steel sheet and thus controls the diameter of the outer opening 29 of the perforation 22. This outer opening should be not substantially more than $1/16$ of an inch in diameter. By making the perforation with such a tool, the perforation is tapered inwardly as shown in Fig. 5 and is surrounded at its inner end with an annular projection such as the ring or collar 30 formed by upsetting the metal of the steel sheet, thus providing an inner opening 31 for the perforation that is smaller in diameter than the outer opening 29. And all of the perforations will be uniform. This inwardly tapering contouring of the perforations 22 coupled with the inner encircling collar or ring 30, is highly effective in providing ample gas-venting area while yet retaining in the can substantially all of the fine solids therein. So these characteristics of the perforations are important whether they are made in the can after it is formed, or in the steel sheet before it is formed.

Blast furnace flue dust is blown from the furnace by the blast of air rising upwardly therein and is carried over into the dust-catcher, so this dust contains both manganese ore particles and carbon-bearing coke particles that have been gas borne to and into the dust-catcher. Thus they are finely divided in particle size, and there is more than enough carbon in the dust to satisfy the carbon requirements of the ore reduction that takes place within the can. Under certain conditions when using a poor grade of coke, excess coke fines are produced whereupon it may be desirable to run the flue dust from the dust-catcher over a screen having proper sized openings to reject the over-size coke particles. Since the particles have been reduced in particle size sufficient to enable them to have been gas-borne, they are sufficiently diminuted and sufficiently intimately associated to provide ideal conditions for the reduction process in the gas-vented but otherwise confined reaction zone. However, this invention can be practiced on ore particles whose size is minus 40 screen mesh and finer.

While the confined reaction zone is important, it does not seem to be dependable unless that space is gas-vented. The gas in being vented also has the effect of producing some agitation in the reactable components of the can so that new interfaces are continually being presented to each other whereby the maximum effect of the chemical reducing reaction is attained. The venting of the outflowing gas must be provided under conditions where by the effect of the confined reaction zone is not lost, namely, whereby unreacted solid particles do not escape through the gas-venting perforations. To that end, they must be small, say of the order of $1/32$ of an inch or even a little larger, perhaps as much as $1/16$ of an inch. Actually, then they can be somewhat larger than the particle size of the particles of ore and carbon, but as a result of their construction and arrangement, there seems to be little tendency of these particles to escape provided there are enough of these internally-ringed perforations and they are sufficiently distributed over the surface of the can to permit the gas to escape at substantially the same rate as it is formed. In other words, if substantially no internal gas pressure is set up in the can, there is no projecting force exerted on the solid particles being reacted within the can. Moreover, in transporting filled cans, there seems to be little tendency for the fine solids to flow outwardly through these particular perforations.

While this invention has been described as being particularly advantageous in treating blast furnace flue dust for the recovery of ferro-manganese, it can be used in the same manner for accomplishing reduction of ore in a properly gas-vented confined reaction zone, such as in a non-contaminating container, using other metal oxide ores, so long as they are suitably diminuted and intimately admixed with a requisite quantity of equally diminuted carbon-bearing material.

I claim:

1. The process of reducing an oxide-bearing ore to the metal phase, which comprises admixing such finely divided ore with more than enough finely divided carbon-bearing material to provide the chemical requirements for the metallic oxide reduction, encasing the mixture and air in a steel can thus providing a confined reduction reaction zone within the can for the reactants therein, perforating the steel to provide the can with uniformly sized holes each tapered inwardly and surrounded with an annularly projecting collar sized to block substantial escape of solids outwardly therethrough during movement of the can, heating the confined contents of the can to about 2,700° F. to yield in the can carbon monoxide and cast iron in molten phase, then raising the temperature of the can above its own melting point, and recovering metal alloyed of the steel of the can and of the metal of the ore, the holes presented to the interior of the can being in individual size and in total cross-sectional area such as to vent gas evolved within the can as a result of reducing action about as fast as formed to prevent rupture of the can but not so fast as to lose the effect of the confined reaction zone within the can for isolating the contents thereof from the environment of the can.

2. The process according to claim 1, wherein the perforating of the steel of the can is accomplished by the use of an annular shouldered tapered-end punch whose shoulder determines the diameter of the outer ends of the holes whereby they are all made uniform.

3. An article of manufacture comprising a steel can sealed without the presence of any substantial amount of lead or tin, and containing encased therein an uncompacted mixture of finely divided metallic oxide-bearing ore and carbon along with air, while the steel of the can contains perforations punched therethrough formed as inwardly tapering holes whose inner ends are surrounded by inwardly extending rings.

4. An article according to claim 3, wherein the steel of the can is 30 gauge in thickness while the perforations therein are substantially $1/16$ of an inch in diameter at their outer ends.

References Cited in the file of this patent

UNITED STATES PATENTS

| | | |
|---|---|---|
| 137,621 | Pedder et al. | Apr. 8, 1873 |
| 194,340 | Du Puy | Aug. 21, 1877 |